United States Patent
Schilling, Jr. et al.

(10) Patent No.: US 6,707,768 B2
(45) Date of Patent: Mar. 16, 2004

(54) RANDOMIZED PLAYBACK OF TRACKS IN A MULTIMEDIA PLAYER

(75) Inventors: Walter W. Schilling, Jr., Livonia, MI (US); Jacob Tanana, Canton, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 210 days.

(21) Appl. No.: 10/080,128

(22) Filed: Feb. 21, 2002

(65) Prior Publication Data

US 2003/0156503 A1 Aug. 21, 2003

(51) Int. Cl.$^7$ ............................................. G11B 21/08
(52) U.S. Cl. ................................. 369/30.08; 369/30.3
(58) Field of Search .......................... 369/30.08, 30.3, 369/30.07, 30.04, 30.06, 30.2, 33.01, 34.01

(56) References Cited

U.S. PATENT DOCUMENTS

| | | | |
|---|---|---|---|
| 4,899,331 A | * | 2/1990 | Masaki et al. .......... 369/178.01 |
| 5,051,973 A | * | 9/1991 | Shiba et al. ............ 369/30.06 |
| 5,109,365 A | * | 4/1992 | Watanabe et al. ....... 369/30.04 |
| 5,301,172 A | * | 4/1994 | Richards et al. ........ 369/30.04 |
| 5,408,448 A | * | 4/1995 | Carman ................ 369/178.01 |
| 5,541,996 A | | 7/1996 | Ridenour |
| 6,031,797 A | * | 2/2000 | Van Ryzin et al. ...... 369/30.28 |
| 6,185,163 B1 | * | 2/2001 | Bickford et al. ............ 369/7 |
| 6,542,445 B2 | * | 4/2003 | Ijichi et al. ............. 369/30.08 |
| 6,567,351 B1 | * | 5/2003 | Landsvogt .............. 369/30.64 |

FOREIGN PATENT DOCUMENTS

EP 0177088 4/1986

* cited by examiner

*Primary Examiner*—Tan Dinh
(74) *Attorney, Agent, or Firm*—MacMillan, Sobanski & Todd, LLC

(57) ABSTRACT

An audio reproduction apparatus randomizes or shuffles the playback order of tracks from a prerecorded media such as a compact disc within a multiple-disc changer. Shuffle sequences are generated using a linear congruential random number generator (LCRNG). The shuffle sequence does not have to be stored since a next track in the sequence can always be generated from the LCRNG using a particular set of parameters. The parameters are determined in response to the number of track (or discs) in a sequence and include elements obtained from a lookup table and elements that are randomly selected so that the same sequence is not always generated for a certain sequence length.

20 Claims, 6 Drawing Sheets

| Tracks T | modulus m | multiplier a |
|---|---|---|
| 1-8 | 8 | 5 |
| 9 | 9 | 7 |
| 10-16 | 16 | 13 |
| 17-18 | 18 | 13 |
| 19-24 | 24 | 13 |
| 25 | 25 | 21 |
| 26-27 | 27 | 25 |
| 28-32 | 32 | 29 |
| 31-36 | 36 | 25 |
| 37-40 | 40 | 21 |
| 41-45 | 45 | 31 |
| 46-48 | 48 | 37 |
| 49 | 49 | 43 |
| 50 | 50 | 41 |
| 51-54 | 54 | 49 |
| 55-56 | 56 | 29 |
| 57-63 | 63 | 43 |
| 64 | 64 | 61 |
| 65-72 | 72 | 61 |
| 73-75 | 75 | 61 |
| 76-80 | 80 | 61 |
| ... | ... | ... |

RANDOMIZED PLAYBACK OF TRACKS IN A MULTIMEDIA PLAYER

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to audio reproduction apparatus, and, more specifically, to randomizing the playback order of tracks from a prerecorded media.

The shuffle feature is a well known function of audio playback equipment wherein the order in which tracks on a prerecorded media are played back is randomized, thereby adding variety and unpredictability to a listening experience. Compact disc audio (CD-audio) players in particular have led to widespread use of the shuffle feature.

Rather than use a truly random selection of a next track to be played, it is known that most users prefer a random order in which a single track is not played a second time until all tracks have been played once. In the past, this has required either 1) storing an entire sequence in memory to ensure that a track is not replayed, or 2) processing using repeated application of arithmetic operations (such as shifting, scaling, etc.) which do not always produce an acceptable result and may have to be repeated until an acceptable sequence is obtained. Thus, an improved method of generating a shuffle sequence is desired.

As mechanisms for handling and reading compact discs (CDs) have been miniaturized, the use of multiple-disc CD changers has grown. When shuffling the playback order across multiple discs, however, the prior art has generated shuffle sequences in which track locations between different discs does not affect the sequence (i.e., it is as though all the tracks were on one big disc). The resulting frequent changing of discs between random selections may not match users preferences. Thus, an improved method of shuffling tracks across multiple discs is also needed.

SUMMARY OF THE INVENTION

The present invention has the advantages of generating shuffle sequences which are always valid, do not repeat tracks while there are tracks that have not yet been played, and do not require complex processing. When shuffling across multiple discs, a more natural and consistent operation is obtained.

One primary aspect of the invention for achieving these results includes a method of determining a shuffle sequence for playing tracks from a prerecorded media. A modulus m is determined that is greater than or equal to the total number of tracks T to be randomized in the shuffle sequence. The tracks are stored on the prerecorded media in a predetermined order $x_i$, where i is an index. A multiplier a is determined for which (a−1) is a multiple of every prime number less than m that is a factor of m, wherein if m is a multiple of 4 then (a−1) is also a multiple of 4. An increment c is determined which is relatively prime with m. The shuffle sequence is determined in response to a linear congruential random number generator using m, a, and c.

DETAILED DESCRIPTION OF PREFERRED EMBODIMENTS

Figure 1:
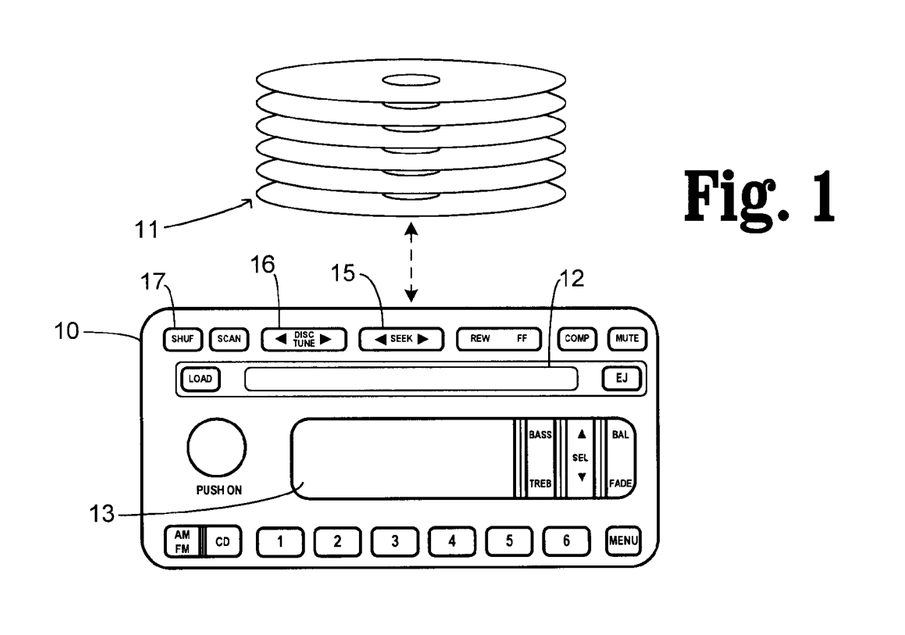
FIG. 1 illustrates an audio playback apparatus for accepting a plurality of compact discs.
Figure 2:
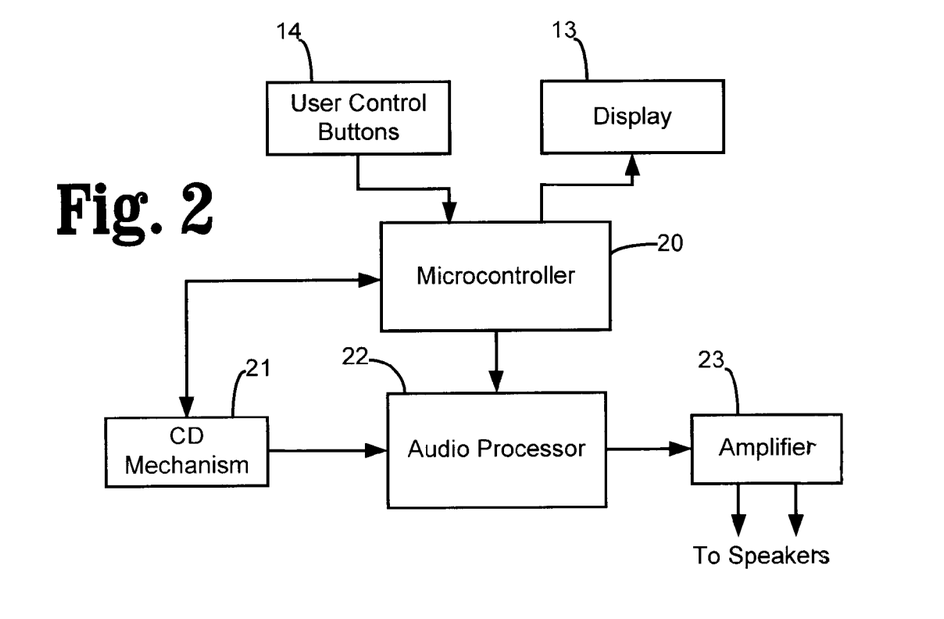
FIG. 2 is a block diagram showing elements of an audio system employing the present invention.

Referring to FIG. 1, an audio playback apparatus 10 may comprise a multiple-disc changer for receiving a plurality of CD's 11 via a disc loading slot 12. A human-machine interface comprises a display 13 and a plurality of user control inputs 14. Particular relevant to the present invention, input 14 include a seek up/down rocker switch 15, a disc tune up/down rocker switch 16, and a shuffle button 17. Functional blocks of apparatus 10 are shown in FIG. 2, including a microcontroller 20, a CD changer mechanism 21, an audio processor 22, and an amplifier 23 for providing audio signals to speakers (not shown). Mechanism 21 typically includes decoders and its own microprocessor for controlling loading, ejecting, and reading of CD's and for communicating with microcontroller 20.

Apparatus 10 provides a shuffle mode in response to activation of shuffle button 17. Preferably a shuffle icon is displayed on display 13 to indicate to a user whether or not the shuffle mode is active. When activated, a randomized playback order of tracks from the loaded audio CD's is utilized when changing tracks (either automatically when one track ends or manually when the user presses seek button 15 to change tracks). Furthermore, according to the present invention, a shuffle sequence is determined for each disc and is maintained until all tracks have been played, the disc is ejected, the shuffle mode is deactivated, or the playback apparatus is turned off.

Figure 3:
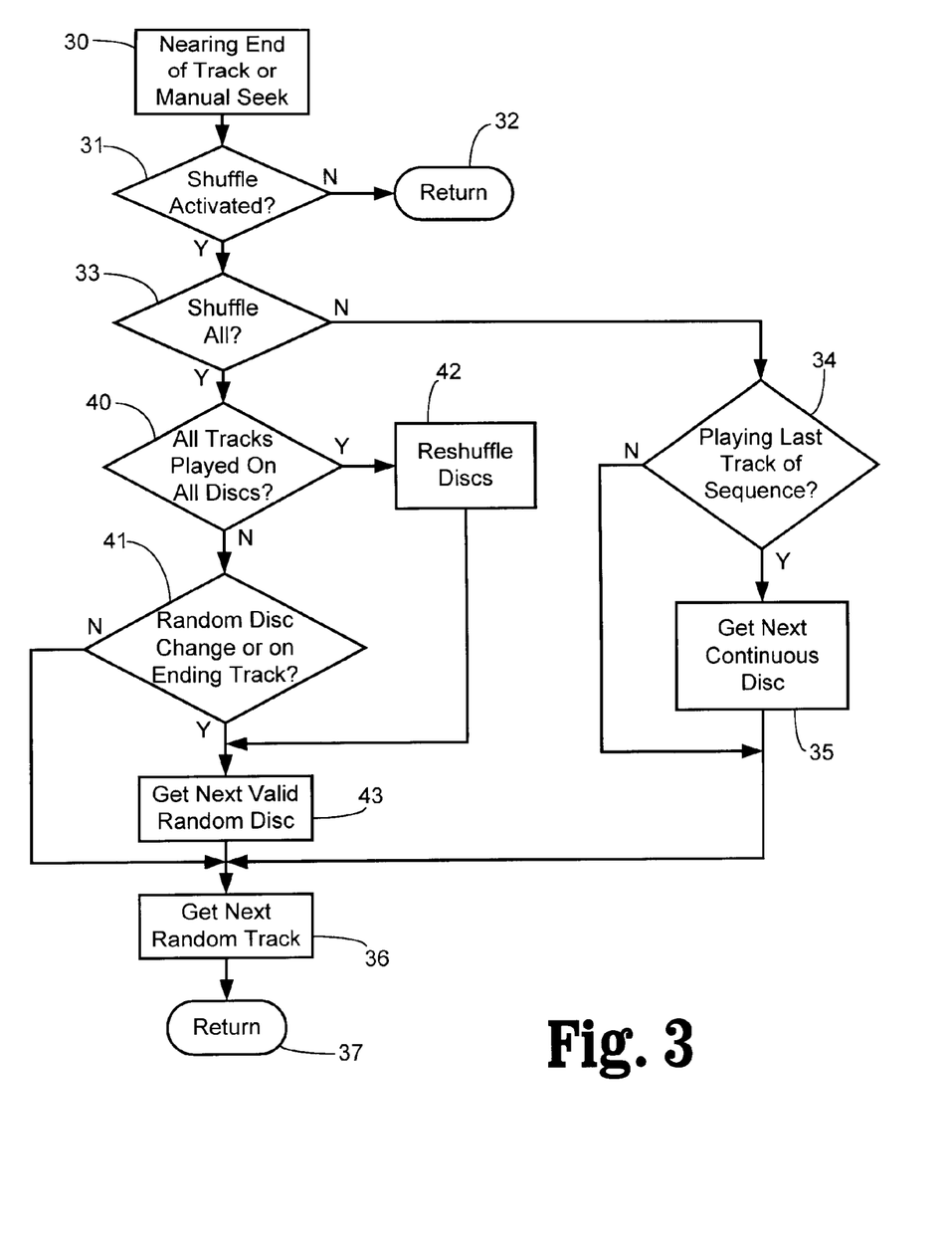
FIG. 3 is a flowchart showing a preferred shuffle process.

FIG. 3 shows a preferred processing of the shuffle mode adapted for a multiple-disc changer. The process is initiated in step 30 when playback nears or actually comes to the end of a track (as determined by the CD mechanism) or when a user manually presses the seek button. In step 31 a check is made to determine whether the playback apparatus is in shuffle mode. If not, then a return to other operating routines (e.g., main program) of the apparatus is made in step 32. If shuffle is activated, then a check is made in step 33 to determine whether "shuffle all" is selected, wherein tracks are shuffled from all available discs in a multiple-disc changer or whether only tracks from the currently playing disc are desired.

If "shuffle all" is not enabled, then shuffle by individual disc is processed in step 34. A check is made to determine whether a shuffle sequence has already been established for the current disc and the last (i.e., ending) track of the sequence is being played. If so, then a change is made to the next continuous (i.e., not random order) disc in the CD changer. After changing discs, or if not playing the last track of a shuffle sequence, then the identity of the next random track is determined in step 36 as will be described in more detail below. A return to the main program is made in step 37.

Returning to step 33, if "shuffle all" mode is active then a check is made in step 40 to determine whether all tracks have been played on all valid audio discs in the changer. If so, then the order of the discs is reshuffled in step 42 (i.e., a new shuffle sequence for changing from disc to disc is initialized as described in more detail below). Then the next (i.e., first) random disc in the disc sequence is identified in step 43 and the next random track is identified in step 36.

If step 40 determines that not all tracks have yet been played, then a check is made in step 41 to determine whether a disc change should be made in the current disc sequence. A change is made either 1) when the ending track of the shuffle sequence for the current disc is playing, or 2) randomly during playback. Preferably, a 50–50 random event is generated so that when one track (other than the ending track) is completed, there is an equal likelihood of staying on the same disc or moving on to the next random disc. If a disc change is required or is randomly generated, then the next valid random disc is identified in step 43. Otherwise, the next random track is identified in step 36.

Figure 4:
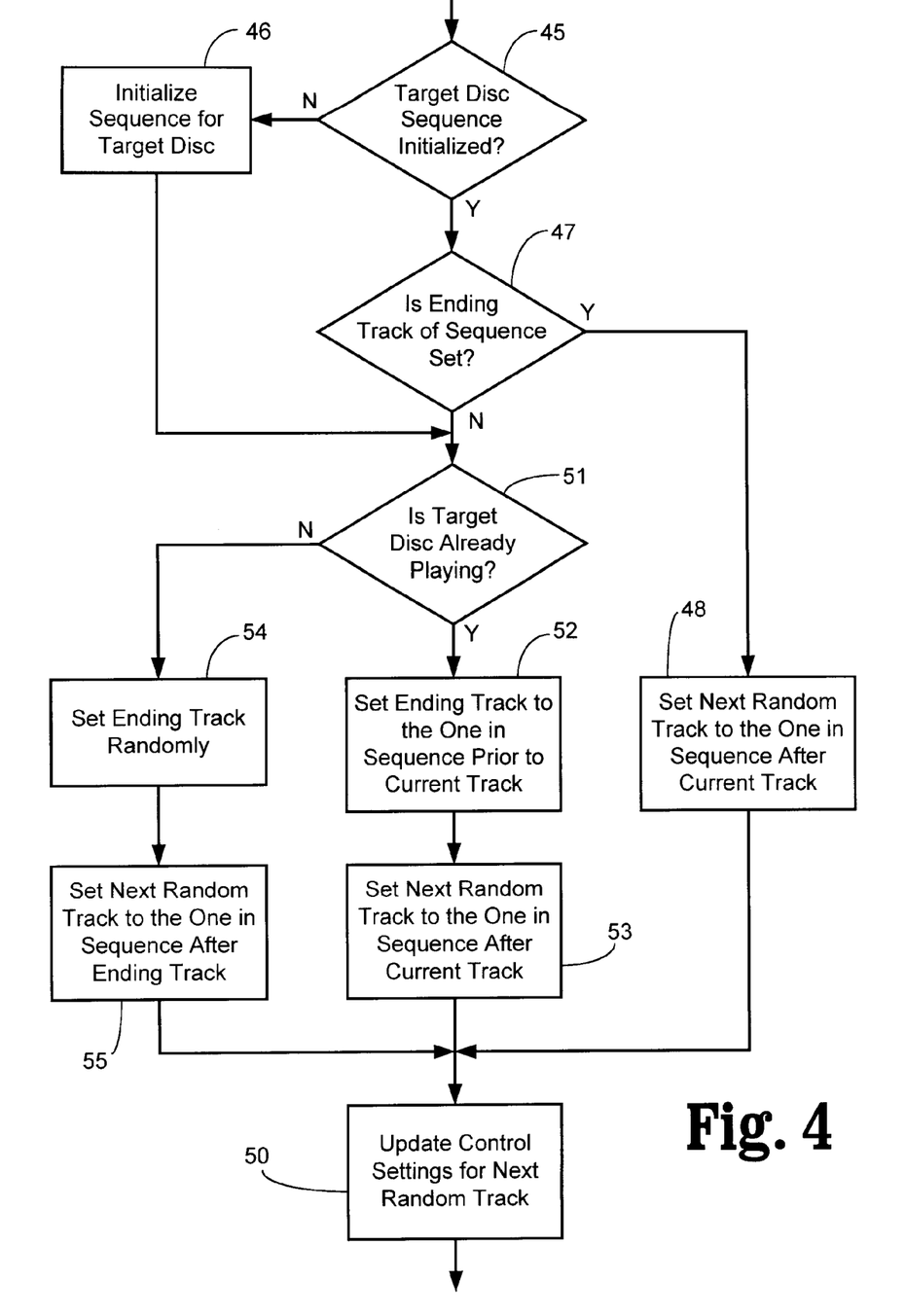
FIG. 4 is a flowchart showing a process for identifying a next random track in greater detail.

FIG. 4 shows step 36 in greater detail. A check is made in step 45 to determine whether a shuffle sequence has already been initialized for the target disc (i.e., the current disc if a disc change is not needed or the next disc if a change is needed). If not, then a shuffle sequence is initialized for the target disc in step 46. Initialization using a linear congruential random number generator will be discussed below with reference to FIG. 7. If the target disc already has a shuffle sequence initialized, then a check is made in step 47 to determine whether an ending track within that shuffle sequence has been set.

If the ending track was already set, then the next random track is set in step 48 to the next one in the shuffle sequence after the currently playing track (at this point in the method, the currently playing track could not be the ending track). The next track in the sequence is identified by putting a track number corresponding to the current track into the linear congruential random number generator using previously initialized parameters, as is described below. Once the next random track is identified, controls within the playback apparatus are set in step 50 in order to implement the desired random playback. In some embodiments, there may be the possibility of entering step 48 when the next random track has already been set. In that case, additional logic may be provided to bypass steps 48 and 50 whenever a next random track is already pending.

After initializing a sequence in step 46, or if the ending track has not been set in step 47, then a check is made in step 51 to determine whether the target disc is already playing (i.e., if the target disc is the current disc). If the target disc is playing (e.g., the shuffle mode was activated after a current track on the current disc was already playing), then the ending track is set in step 52 to be the track in the shuffle sequence that is one prior to the current track. Preferably, the linear congruential random number generator (LCRNG) described below is used to determine which is the previous random track in the sequence. Since the LCRNG is a periodic in nature, the previous random track can be identified simply by traversing the sequence through one complete cycle. In step 53, the next random track is set to the one next in the sequence after the current track (again using the LCRNG and the previously initialized LCRNG parameters).

If step 51 determines that the target disc is not already playing (i.e., a disc change will be made to a disc that has not yet been played), then the ending track for the shuffle sequence of the target disc is set randomly in step 54. Any suitable random number generator may be used to randomize the ending track (and consequently the starting track), such as a number generator based on a time of day clock, checksum values, or a count of random events such as system interrupts in the microcontroller. The LCRNG provides a deterministic order for a shuffle sequence but does not itself specify a starting point. In step 55, the next random track is set to the one in the shuffle sequence after the ending track that was just randomly assigned (i.e., the ending track number is input into the LCRNG to generate the next random track).

Figures 5, 8:
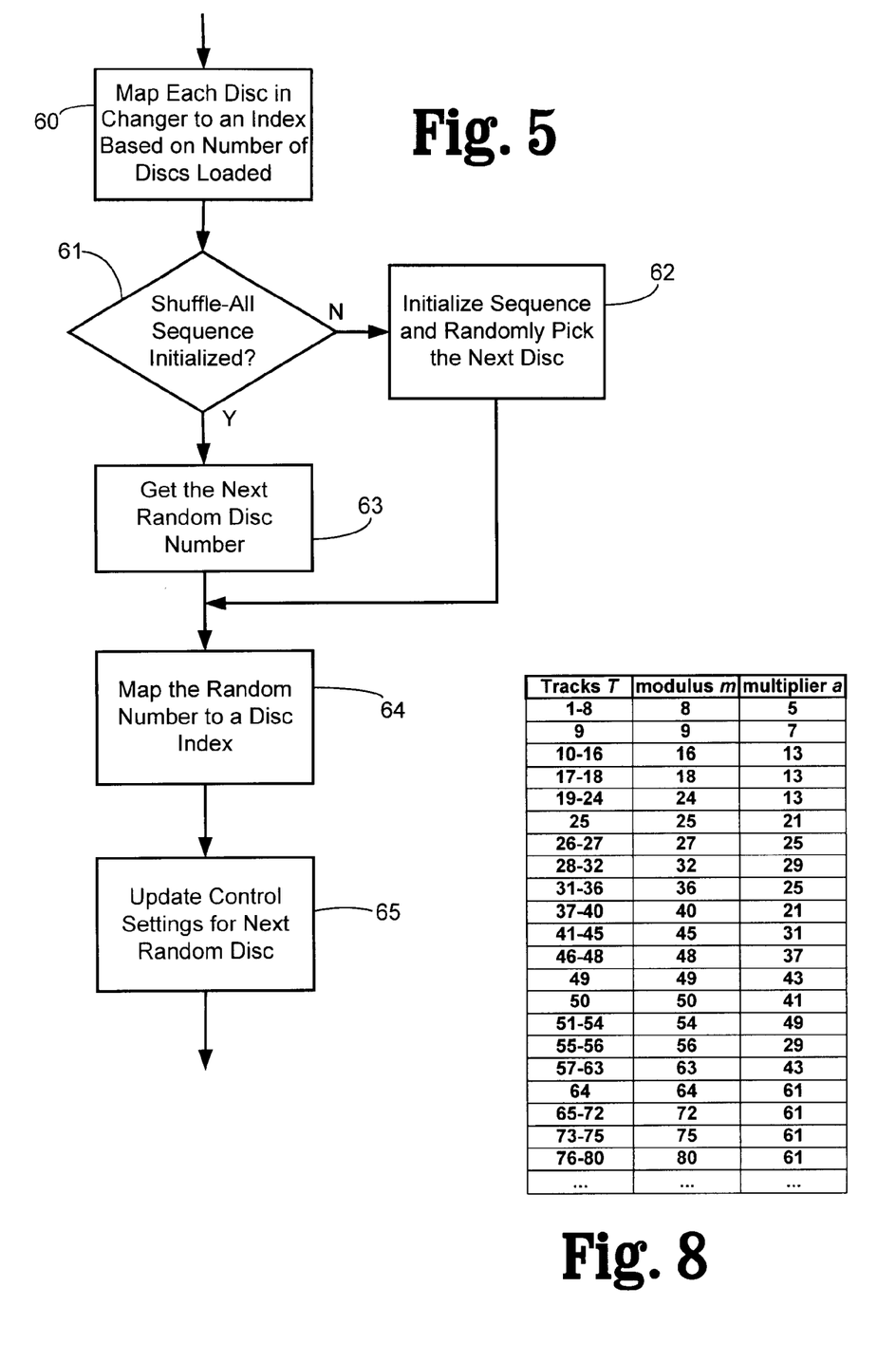
FIG. 5 is a flowchart showing a process for identifying a next random disc in greater detail.
FIG. 8 is a lookup table for determining certain ones of the parameters of a linear congruential random number generator.

A preferred method of identifying a next valid random disc performed in step 43 of FIG. 3 is shown in greater detail in FIG. 5. In step 60, each disc loaded into the CD changer is mapped to an index based on the total number of discs loaded. In other words, if there are 4 discs loaded, then the discs in their respective disc slots are mapped to an index 1 through 4. Preferably, the mapping is performed using a perfect hash function. In step 61, a check is made to determine whether a shuffle-all sequence (i.e., a random sequence to be used for changing discs) has been initialized. If not, then the disc shuffle-all sequence is initialized in step 62 and a sequence number representing the next (i.e., first random) disc to be played is randomly selected. Preferably, the sequence may be determined using a LCRNG.

If the shuffle-all sequence was already initialized in step 61, then a sequence number representing the next random disc to be played is obtained in step 63 (e.g., by inputting the current disc number into the LCRNG). In step 64, the random disc number from step 62 or step 63 is mapped back to the disc index from step 60. In step 65, control settings are updated to implement a change to the next random disc that was just identified.

The process for determining a previous random disc is similar to the above and will not be specifically described.

Figure 6:
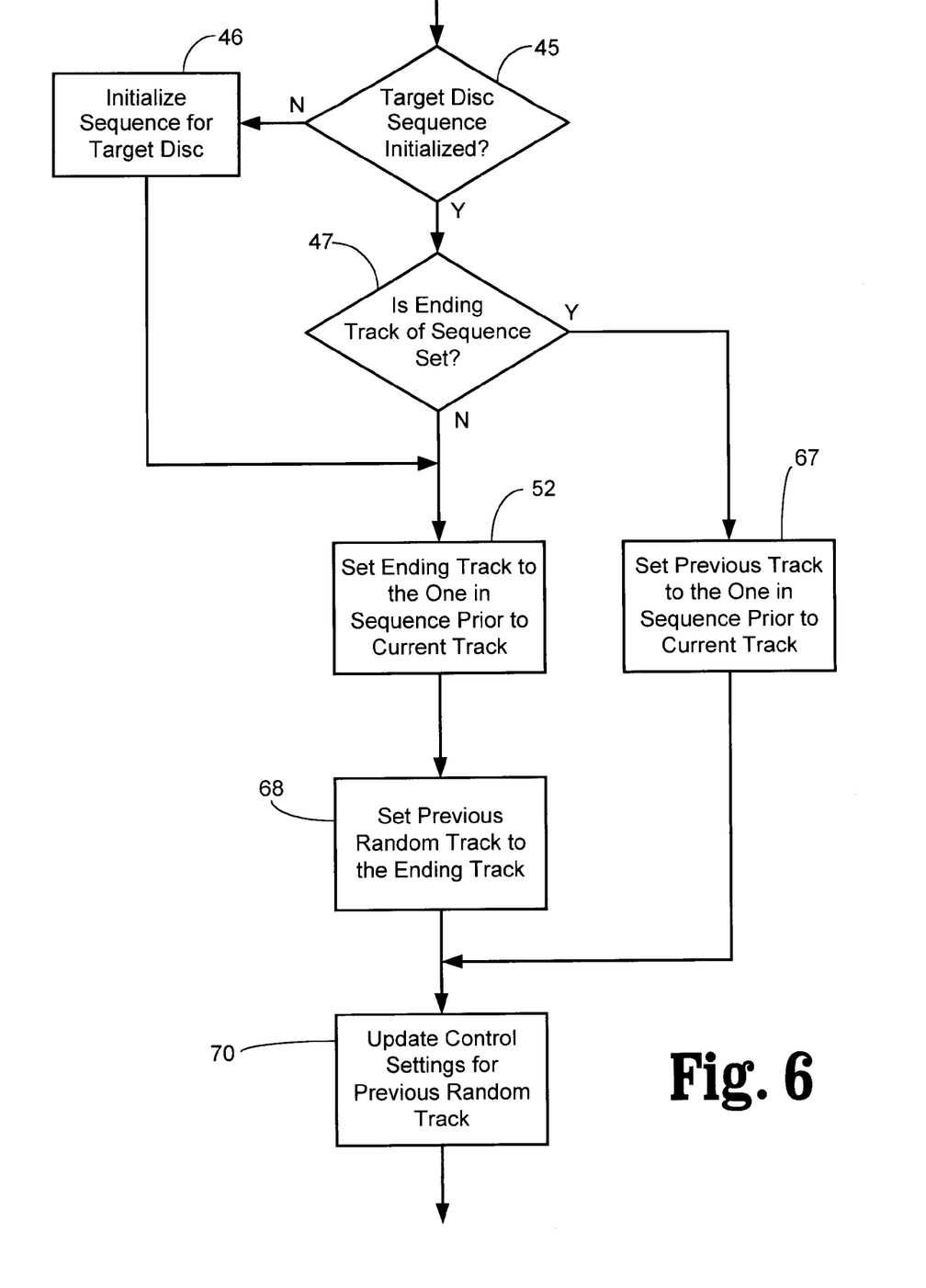
FIG. 6 is a flowchart showing a process for identifying a previous random track in greater detail.

When the end of a track currently being played is detected (e.g., the track elapsed time is within a predetermined time of the track total time, as determined by the CD mechanism), an identification of the next track is needed. Similarly, if the seek/next button is pressed, the next random track must be identified and retrieved. If the seek/previous button is pressed, then a previous random track must be identified and retrieved. FIG. 6 shows modifications to the flowchart of FIG. 4 for obtaining a previous random track. If the ending track was already set in step 47, then the previous random track is set to be the one in the sequence prior to the current track in step 67. Specifically, if a LCRNG is employed to generate the sequence, then the shuffle sequence is followed through one complete cycle to identify the previous track. Alternatively, the entire sequence could be stored as part of its initialization so that the previous random track could be determined using a table lookup.

If the ending track has not already been set in step 47, then it is set in step 52 to the one in the sequence prior to the current track. Then the previous random track is set to point to the ending track in step 68. Thus, after the previous random track is played (i.e., in response to the seek/previous button), the next song to play will be the one that was the current track when the button was pressed. Control settings for executing the change to a previous random track are updated in step 70.

Figure 7:
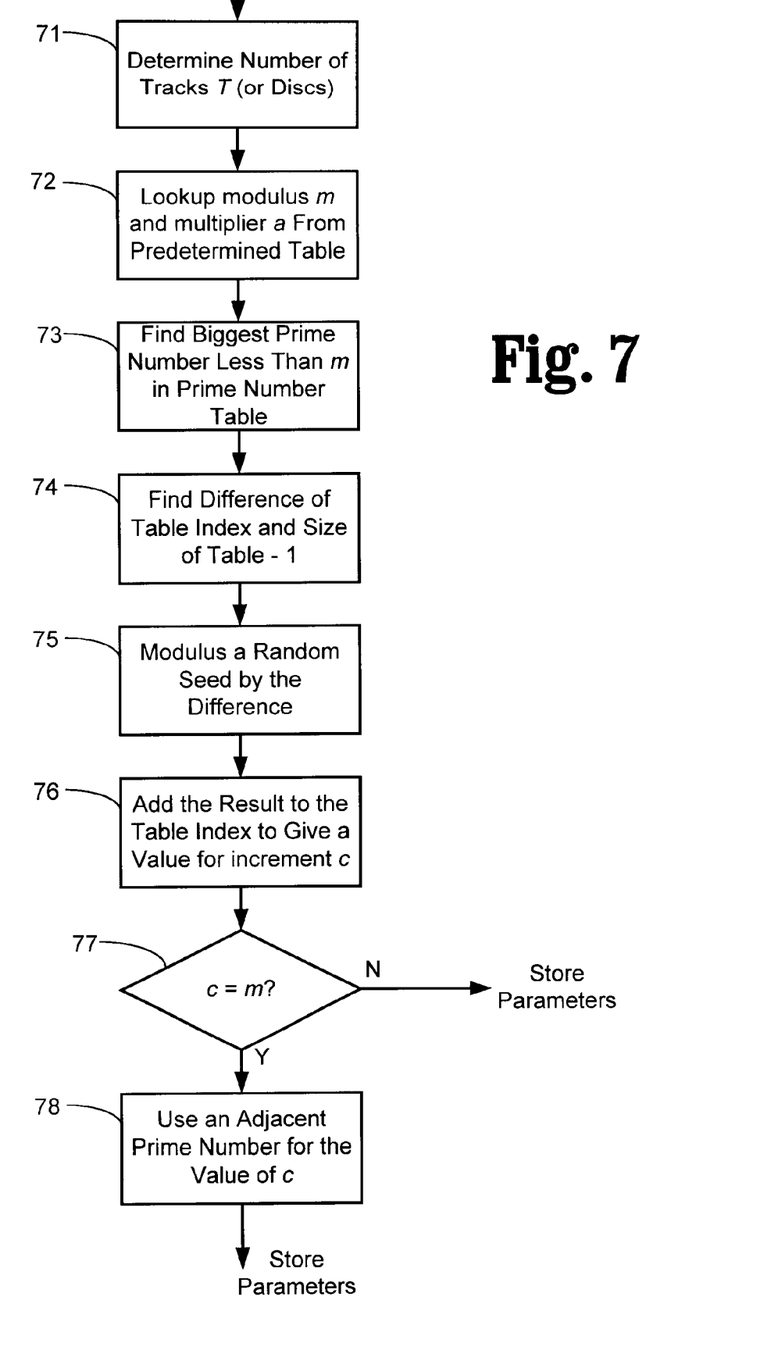
FIG. 7 is a flowchart showing initialization of a shuffle sequence for a particular disc.

Initialization of a random sequence using a linear congruential random number generator is shown in FIG. 7. The LCRNG is used because with appropriate selection of parameters, it provides a random sequence with any desired period in which each number appears only once per period.

Furthermore, by storing the parameters of the LCRNG, successive numbers in the sequence can be generated at any time without having to store the entire sequence.

The LCRNG takes the form of:

$$x_{i+1}=(a \cdot x_i+c) \bmod m$$

where $x_i$ are the numbers in the sequence, a is a multiplier, c is an increment, and m is a modulus. m, a, and c must satisfy certain criteria in order to provide a sequence with the desired properties as follows:

i) modulus m must be greater than or equal to the total number of tracks T to be randomized in the shuffle sequence;

ii) one less than multiplier a (i.e., (a−1)) must be a multiple of every prime number less than m that is also a factor of m;

iii) if m is a multiple of 4 then (a−1) must also be a multiple of 4; and iv) increment c and modulus m must be relatively prime with respect to one another.

The period of the sequence equals modulus m. In the preferred embodiment, m is allowed to be greater than the number of tracks T to reduce memory storage requirements and overhead. More specifically, one value for modulus m can be used for track sequences of more than one size. When a random track number $x_i$ is generated which is greater than the desired sequence size (i.e., $x_i$>T) then the number is ignored and the next random track is immediately retrieved (e.g., in step 48 of FIG. 4).

To initialize a shuffle sequence, the total number of tracks T on a disc (or the total number of discs loaded when determining a shuffle-all disc sequence) is determined in step 71. A modulus m and a multiplier a are retrieved from a predetermined table in step 72. The predetermined table is shown in FIG. 8, wherein values are stored that have been precalculated to satisfy the above criteria for ensuring a non-repeating sequence of period m. For example, if T is in the range from 1 to 8, then modulus m is assigned a value of 8 and multiplier a is assigned a value of 5, and so on.

Based on the determined value of m, a value is determined for increment c. Rather than use a predefined value for c, the present invention randomly selects from a plurality of valid values for c. This ensures that the same random sequence is not always used for a particular value of m. The method for finding c begins in step 73 by finding the biggest prime number which is less than m from a prime number table (if c is a prime number then it is necessarily relatively prime with m). In step 74, the difference is found between a table index for the identified prime number (i.e., index j where the biggest prime number less than m is the jth entry in the prime number table) and the size of the table minus 1. For example, if the table size is 50 and j is 30, then the difference is 19. Next a random integer is generated in step 75 between zero and the difference (e.g., by taking the modulus of a random seed number). The random integer is added to table index j in step 76 to give a preliminary value for c. Thus, a prime number is selected from the prime number table between the smallest usable number and the end of the table.

In step 77 a check is made to determine whether the preliminary value for c is equal to m, which is the one case using this method where c and m would not be relatively prime. If they are not equal, then the preliminary value is stored as the final value for c along with the values for m and a. If the preliminary value for c is equal to m, then an adjacent value from the prime number table is selected in step 78. Preferably, the next larger prime number is used, but if the end of the table is reached then the next smaller prime number is used.

What is claimed is:

1. A method of determining a shuffle sequence for playing tracks from a prerecorded media, comprising the steps of:

determining a modulus m greater than or equal to the total number of tracks T to be randomized in said shuffle sequence, said tracks being stored on said prerecorded media in a predetermined order $x_i$, where i is an index;

determining a multiplier a for which (a−1) is a multiple of every prime number less than m that is a factor of m, wherein if m is a multiple of 4 then (a−1) is also a multiple of 4; and determining an increment c which is relatively prime with m;

wherein said shuffle sequence is determined in response to a linear congruential random number generator.

2. The method of claim 1 wherein said linear congruential random number generator determines a next track number $x_{i+1}$ of said shuffle sequence in response to the formula:

$$x_{i+1}=(a \cdot x_i+c) \bmod m.$$

3. The method of claim 1 wherein said increment c is randomly selected from a plurality of prime numbers.

4. The method of claim 1 wherein said modulus m and said multiplier a are obtained from a predetermined table in response to said total number of tracks T.

5. The method of claim 1 further comprising the step of:

determining a beginning track number $x_0$ when said shuffle sequence is initialized, wherein said beginning track number $x_0$ is comprised of a currently playing track when said shuffle mode is initiated.

6. The method of claim 1 wherein a beginning track number $x_0$ is randomly selected.

7. The method of claim 1 wherein a next track $x_{i+1}$ in said shuffle sequence is determined while a track $x_i$ is playing, and wherein if said shuffle sequence has been previously initialized with values for m, a, and c then said determination of said next track $x_{i+1}$ re-uses said previously initialized values for m, a, and c.

8. The method of claim 1 wherein shuffle sequences are generated for a plurality of discs in a multiple-disc changer, said method further comprising the steps of:

randomly determining when to change to a different disc in said multiple-disc changer; and when changing to said different disc, determining a next disc using a random disc sequence;

wherein said random disc sequence is determined in response to a linear congruential random number generator.

9. A method of operating a multimedia player in a shuffle mode for playing selections from a prerecorded media, comprising the steps of:

initiating a shuffle mode;

detecting a trigger event requiring determination of a next random track number;

detecting whether a shuffle sequence is initialized for said prerecorded media and if not, then:

determining a modulus m greater than or equal to the total number of tracks T to be randomized in said shuffle sequence, said tracks being stored on said prerecorded media in a predetermined order $x_i$, where i is an index;

determining a multiplier a for which (a−1) is a multiple of every prime number less than m that is a factor of m, wherein if m is a multiple of 4 then (a−1) is also a multiple of 4; and determining an increment c which is relatively prime with m; and determining said next random track number using said determined modulus m, said determined multiplier a, and said determined increment c in a linear congruential random number generator.

10. The method of claim 9 wherein said trigger event is comprised of a detection of an ending of a currently playing track.

11. The method of claim 10 wherein said trigger event is comprised of detection of a predetermined time interval remaining until playing of said currently playing track is completed.

12. The method of claim 9 wherein said trigger event is a manual navigation action initiated by a user.

13. The method of claim 9 wherein a next track $x_{i+1}$ in said shuffle sequence is determined while a track $x_i$ is playing, and wherein if said shuffle sequence has been previously initialized with values for m, a, and c then said determination of said next track $x_{i+1}$ re-uses said previously initialized values for m, a, and c.

14. The method of claim 9 wherein shuffle sequences are generated for a plurality of discs in a multiple-disc changer, said method further comprising the steps of:

randomly determining when to change to a different disc in said multiple-disc changer; and when changing to said different disc, determining a next disc using a random disc sequence;

wherein said random disc sequence is determined in response to a linear congruential random number generator.

15. Audio apparatus comprising:

an audio source generating audio signals from a prerecorded media;

a user control interface for initiating a shuffle mode; and a controller responsive to said shuffle mode for generating a shuffle sequence in response to a linear congruential random number generator, wherein said controller:

determines a modulus m greater than or equal to the total number of tracks T to be randomized in said shuffle sequence, said tracks being stored on said prerecorded media in a predetermined order $x_i$, where i is an index;

determines a multiplier a for which (a−1) is a multiple of every prime number less than m that is a factor of m, wherein if m is a multiple of 4 then (a−1) is also a multiple of 4; and determines an increment c which is relatively prime with m.

16. The audio apparatus of claim 15 wherein said controller detects a trigger event for indicating a need to identify a next random track in said shuffle sequence, wherein said trigger event includes detection of an ending of a currently playing track.

17. The audio apparatus of claim 15 wherein said audio source generates audio signals from a plurality of prerecorded media contained therein, and wherein said controller randomly determines when to change to a different one of said prerecorded media and determines a next one of said prerecorded media to be reproduced using a random disc sequence.

18. The audio apparatus of claim 17 wherein said audio source is comprised of a CD changer and said prerecorded media are comprised of compact discs loaded into said CD changer.

19. The audio apparatus of claim 15 further comprising a random number generator for randomly selecting a value for said increment c.

20. The audio apparatus of claim 15 further comprising a table comprising predetermined values for modulus m and multiplier a according to said total number of tracks T.

* * * * *